US008893591B2

(12) United States Patent
DePue (10) Patent No.: US 8,893,591 B2
(45) Date of Patent: Nov. 25, 2014

(54) FASTENER ATTACHMENT SYSTEM AND METHODS OF USE

(76) Inventor: Bill R. DePue, Delores, CO (US)

( * ) Notice: Subject to any disclaimer, the term of this patent is extended or adjusted under 35 U.S.C. 154(b) by 380 days.

(21) Appl. No.: 13/331,001

(22) Filed: Dec. 20, 2011

(65) Prior Publication Data

US 2013/0152743 A1   Jun. 20, 2013

(51) Int. Cl.
| | | |
|---|---|---|
| B25B 13/02 | (2006.01) | |
| B25B 1/20 | (2006.01) | |
| B25B 23/10 | (2006.01) | |
| B25B 23/08 | (2006.01) | |
| B25B 1/24 | (2006.01) | |
| B25B 1/10 | (2006.01) | |

(52) U.S. Cl.
CPC ............... *B25B 23/10* (2013.01); *B25B 23/08* (2013.01); *B25B 1/2478* (2013.01); *B25B 1/103* (2013.01)
USPC ................................ 81/125; 81/124.1; 269/43

(58) Field of Classification Search
CPC ........................................................ B25B 23/10
USPC ........................................................ 81/125, 13
See application file for complete search history.

(56) References Cited

U.S. PATENT DOCUMENTS

| | | | | |
|---|---|---|---|---|
| 1,350,558 | A | * | 8/1920 | Messenger ...................... 81/453 |
| 1,925,385 | A | * | 9/1933 | Humes et al. ...................... 7/165 |
| 2,114,736 | A | | 4/1938 | De Right et al. |
| 2,220,314 | A | | 11/1940 | Blackburn |
| 2,264,573 | A | * | 12/1941 | Johnson et al. .............. 81/124.1 |
| 2,742,806 | A | | 4/1956 | Pavelka |
| 2,768,548 | A | | 10/1956 | Spears |
| 2,966,817 | A | | 1/1961 | Wengen |
| 3,534,993 | A | | 10/1970 | Le Vesque, Sr. |
| 4,066,250 | A | * | 1/1978 | Campbell ...................... 269/43 |
| 4,583,724 | A | * | 4/1986 | Huang ............................. 269/88 |
| 5,249,489 | A | * | 10/1993 | Weisman ..................... 81/124.1 |
| 5,355,752 | A | * | 10/1994 | Keenan et al. .................. 81/453 |
| 6,606,924 | B2 | * | 8/2003 | Chandler et al. ............... 81/90.2 |
| 7,143,668 | B2 | | 12/2006 | Johnson et al. |
| 7,219,581 | B2 | * | 5/2007 | Tulloch et al. ................... 81/112 |
| 7,341,473 | B2 | | 3/2008 | Gaidosch |

(Continued)

FOREIGN PATENT DOCUMENTS

| | | |
|---|---|---|
| JP | 09074635 A | 3/1997 |
| JP | 2009253304 A | 10/2009 |

OTHER PUBLICATIONS

Notification of Transmittal of the International Search Report and the Written Opinion of the International Searching Authority, or the Declaration re PCT/US2012/071032; date of mailing Apr. 19, 2013; 9 pages.

*Primary Examiner* — Bryan R Muller
(74) *Attorney, Agent, or Firm* — Perkins Coie LLP (57) ABSTRACT

A system for engaging fasteners includes a socket assembly and a fastener jig. The socket assembly having a socket body and a spring blade assembly, which includes a blade retaining ring and a plurality of resiliently deformable retaining blades that are movable with respect to a blade guide, between releasing and securing positions that selectively enclose and expose the socket body opening. The fastener jig includes a jig frame and at least one pair of opposing fastener jaws, which are movable between a releasing position and a securing position. The fastener jig may include a pair of opposing mounting jaws movable between a releasing position and a securing position. The socket assembly and fastener jig are configured to be operated at the distal ends of elongated tool arms, such as lineman hot-sticks.

16 Claims, 8 Drawing Sheets

(56) References Cited

U.S. PATENT DOCUMENTS

| | | |
|---|---|---|
| 7,909,376 B1 | 3/2011 | McKinley |
| 2008/0230996 A1 | 9/2008 | Sylvan |
| 2009/0308210 A1 | 12/2009 | Elgin |
| 2011/0294332 A1 | 12/2011 | Lee et al. |

* cited by examiner

FASTENER ATTACHMENT SYSTEM AND METHODS OF USE

BACKGROUND

An overhead power line consists of electrical conductors suspended by insulators attached to towers or utility poles. Since most of the insulation is provided by air, overhead power lines are generally the lowest cost method of transmission for large quantities of electric energy. Commonly, overhead lines use bare aluminum conductors or aluminum conductors with a steel core. The conductors are supported and attached to the towers/wood pole structures via glass, ceramic, or polymer insulators. At the terminal ends of each line (generally at a substation or switching station), the conductors are commonly dead-ended and routed through disconnect switches and breakers so that the line can be de-energized for maintenance. In addition, in some instances, lines are tapped and routed to another substation or switching station. At these tap locations, the conductors are dead-ended and generally routed through disconnect switches so that the tapped line can be de-energized for maintenance.

Oftentimes, linemen need to perform maintenance on the transmission lines while the line remains energized. In particular applications, linemen may need to disconnect and re-attach hot jumpers to a disconnect switch located at a tap location or terminal end of a line. This can oftentimes be a difficult and tedious task to line up the jumper connector pad with the switch terminal connector or dead-end terminal connector pad, install the bolts, nuts, and washers, and tighten the connection. This can be a simple three minute job, if performed on the ground or on de-energized equipment. However, such work is frequently performed on energized equipment, in a bucket suspended well above the ground, using numerous, eight foot or longer, fiberglass hot-sticks. Factor in various wind and weather conditions making a single jumper connection that can take an hour or more to complete.

Throughout history, the prior art has endured attempts by workmen to make the task of assembling conductor attachment components with one another using fasteners easier, safer and faster. Typically, the need arises, as discussed above, where the orientation or locations of the conductor attachment components on a structure or tower create a difficult and tedious task for the workmen. For example, workmen frequently have to apply fastener components, such as washers and nuts, to various conductor attachment components. Commonly, it is difficult for a tool to reach the area on a structure where conductor attachment components need to be coupled together with fasteners. This may be due to a great distance separating the workmen from the structure, by the configuration of the structure, or obstacles positioned between the workmen and the structure. All too frequently, the workmen will "engineer" a solution using various adhesives, tape, magnets, or even chewing gum in order to adhere fastener components to a tool so that the fastener components do not become disengaged from the tool until they have been initially applied to the conductor attachment component on the structure. Unfortunately, such on the spot solutions are impractical and unreliable. When such attempts fail, fastener components typically fall from the tool being used. When fastener components fall, it may be into a location where the fastener components can only be retrieved through a great expenditure of additional time and energy. Accordingly, a fastener attachment system is needed that is reliable and simple to use when attaching fasteners and fastener components.

Many times, one or more conductor attachment components need to be secured together with a fastener, such as a threaded bolt, and opposing fastener component, such as a nut and washer. However, due to the location or orientation of the structure, it is difficult for the workmen to simply dispose the threaded bolt through an opening in the conductor attachment component and start the nut at the opposing end of the fastener. In such instances, prior art attempts to position threaded bolts and other fasteners that must be later secured include the use of tape, adhesives and the like. Such efforts have always met with mixed results at best. In particular, fasteners (bolts, nuts and washers) are frequently lost or, if retrievable, serve only to slow the workmen down. Moreover, such prior art attempts fail to provide any form of precision positioning of the fasteners before they are coupled with the structure. In particular, instances where multiple fasteners are required on a conductor attachment component, their distance with respect to one another may require a level of precision that simply cannot be attained through the use of tape, adhesives or other mechanical aids. Accordingly, what is needed is a jig assembly that can accurately position multiple fasteners simultaneously in a fixed orientation to a conductor attachment component so that a workman is free to engage separate tools for securing the fastener components.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The fastener attachment system of the present technology, in various embodiments, includes a socket assembly, which includes a socket body that is removably secured to the distal end portion of a hot-stick or other tool. The socket body forms the frame of the socket assembly. A spring blade assembly is positioned around the socket body and includes a blade retaining ring and a plurality of resiliently deformable retaining blades. The socket body and the blade retaining ring are coaxially aligned such that the blade retaining ring may move toward and away from an open first end portion of the socket body, along a length of the socket body. The retaining blades are each secured, from one end portion, with the blade retaining ring so that the opposite end portions of the retaining blades extend freely and outwardly from the blade retaining ring and the open end portion of the socket body. The second end portions of the retaining blades include tips that are angled inwardly toward a long axis of the socket body. Embodiments of the spring blade assembly also include a blade guide that is secured to the socket body such that one or more open pathways exist between the blade guide and the socket body. The retaining blades are disposed within the one or more open pathways, which are sized to permit sliding, longitudinal movement of the retaining blades. Movement of the blade retaining ring away from the open end portion of the socket body cause the blade tips to move toward one another and the open end portion of the socket body, partially obstructing the open end portion of the socket body. Movement of the blade retaining ring toward the open end portion of the socket body causes the blade tips to move away from one another and away from the open end portion of the socket body, exposing the open end portion of the socket body.

Embodiments of the fastener system include a fastener jig that includes a jig frame. The jig frame includes at least one pair of opposing fastener jaws such that at least one of the fastener jaws is slidably movable between a releasing position and a securing position. A fastener jaw bolt is threadably coupled with at least one of the fastener jaws, such that rotation of the fastener jaw bolt in a first direction moves the fastener jaws toward the securing position and rotation of the fastener jaw bolt in a second direction moves the fastener jaws toward the releasing position. The fastener jig further includes opposing mounting jaws that are coupled with the jig frame such that they are movable between a releasing position and a securing position. The opposing fastener jaws are positioned between the pair of mounting jaws. A mounting jaw bolt is threadably coupled with the fastener jig, such that rotation of the mounting jaw bolt in a first direction moves the pair of mounting jaws toward a securing position. Rotation of the mounting jaw bolt in a second direction moves the pair of mounting jaws into the releasing position.

In some methods of use, one or more bolts are placed, head first, within a bolt head channel between the fastener jaws and tightened so that the bolts extend outwardly from the bolt head channel and the fastener jig. The user may then couple the mounting jaw bolt with a tool, such as the hooked end portion of a hot-stick. The user then extends the hot-stick and fastener jig toward a first structure, such as a switch terminal connector pad, designated to receive the fasteners. The fasteners are guided through openings in the structure. Once a portion of the structure, such as the side edges of the connector pad, is between the mounting jaws, the mounting jaw bolt is rotated until the mounting jaws are in a secure position with respect to the structure.

With the bolts securely positioned within the openings of the structure, a second user may grasp a second structure, such as a jumper connector pad, with another tool, such as a second hot-stick. The lengths of the bolts (already secured with the first structure) are passed through the pair of openings in the jumper connector pad. The first user may then remove his hot-stick from the mounting jaw bolt on the fastener and secure the hot-stick to the socket assembly. The first user may position the blade retaining ring closely adjacent the blade guide so that the retaining blades are placed in an open position. Fastener components, such as a nut, flat washer and spring washer may then be passed between the retaining blades so that they are disposed within the open interior of the socket body. The blade retaining ring is then withdrawn away from the blade guide, which compresses them toward one another and secures the nut within the socket body. With the socket assembly secured to the distal end of the hot-stick, the first user may then place the washers and nut onto the free ends of the bolts that are passing through the first and second structures. After the first user has loosely secured the washers and nut to one of the bolts, the first user may simply pull the socket assembly free from the washer and nut as the retaining blades are formed from a resiliently deformable material. The first user then repeats this step attaching washers and nuts to all of the required bolts. When all of the washers and nuts have been loosely secured, the first user may then exchange the socket assembly for a standard socket that may be extended toward the nuts for tightly securing the same about the bolts. Disassembly of the fasteners to separate the first and second structures from one another may be accomplished by reversing the assembly process.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

The fastener attachment system of the present technology is provided in various embodiments, as described below, which may include one or more separate component parts that work with one another or separately within the fastener attachment system. It is contemplated that the fastener attachment system may be used to secure a wide array of different types of fasteners and fastener components. While the principle exemplary embodiments will include fasteners, such as threaded bolts and fastener components, such as various washers and threaded nuts, the fastener attachment system may be used with a nearly limitless array of fasteners and fastener components. Examples may include curved and straight bolts and locking pins, and various other mechanical fasteners that may be secured or initially secured through pushing, pulling, and rotating forces. Similarly, the embodiments disclosed below may specifically relate to examples of the coupling of equipment on energized transmission lines by one or more linemen. However, as those in the art will appreciate, the following fastener attachment system may be used in a limitless number of applications and industries.

With reference to FIGS. 1A-1E, one component of the fastener attachment system may include a socket assembly 10. In most embodiments, the socket assembly 10 will include a socket body 12 having a long axis that extends through an open first end portion 14, which is in communication with an open interior portion 16. It is contemplated that various embodiments of the socket body 12 will shape one or more interior walls of the open interior portion 16 to accommodate the shape of particular styles of fastener heads. For example, the depicted socket body 12 is provided with an open interior portion 16 having a hexagonal cross section. In such embodiments, bolts or other fasteners having a hexagonal head shape are easily accommodated and manipulated by the socket body 12. A second end portion 18 is positioned opposite the open first end portion 14 and will be provided with a shape specifically designed for operative engagement with a working end of a tool, such as common tool arms like socket wrenches and other industry-specific tools, such as a linemen's hot-stick. In any regard, the second end portion 18 may be provided with an interior that is shaped to have a square cross section to receive a lug or button extending from the desired tool. Other shapes are contemplated, including openings, that may pass through the side walls for passing one or more mounting pins that secure the socket body 12 to the tool being used.

The socket assembly 10 is further provided with a spring blade assembly 20. In various embodiments, the spring blade assembly 20 will include a blade retaining ring 22 and a plurality of resiliently deformable retaining blades 24. Typically, the blade retaining ring 22 will be shaped to have an open interior through which the socket body 12 may be disposed so that the socket body 12 and the blade retaining ring are coaxially aligned with one another. In this orientation, the blade retaining ring 22 may be selectively moved toward and away from the open first end portion 14 of the socket body, along a length of the socket body 12. The retaining blades 24, in various embodiments, are provided as elongated, narrow fingers, having a first end portion 26 and an opposite second end portion 28. The first end portions 26 of the retaining blades 24 are secured with the blade retaining ring 22 so that the second end portions 28 of the retaining blades 24 extend freely and outwardly from the blade retaining ring 22 and the open first end portion 14 of the socket body 12. In various embodiments, the second end portions 28 of the retaining blades 24 are provided with tips 30 that are angled inwardly toward the long axis of the socket body 12 when the retaining blades 24 are secured about a peripheral edge of the blade retaining ring 22. It is contemplated that the retaining blades 24 may be formed from nearly any material, according to the intended use and durability of the fastener attachment system. However, various grades of flat spring steel and other metals will provide the deformable resiliency that may be desired as discussed further below. It is contemplated, though, that other materials, including various plastics and the like, may be used in certain applications.

The spring blade assembly 20 is further provided with a blade guide 32 that is shaped to have an open interior through which the socket body 12 may be disposed, such that the socket body 12 and the blade retaining guide 32 are coaxially aligned. In various embodiments, the blade retaining guide 32 is secured to the socket body 12 in a manner that substantially limits the longitudinal movement of the blade guide 32 along the length of the socket body 12. In at least one embodiment, a plurality of mounting pins 34 are positioned to extend outwardly from the blade retaining guide 32 and into the socket body 12, such that the mounting pins 34 extend at least partially into the open interior portion 16 of the socket body 12. In certain embodiments, such as depicted in the accompanying figures, a pair of mounting pins 34 are positioned directly opposite one another through the blade guide 32. In this manner, the mounting pins 34 may be coupled with the opposing blade guide 32 and socket body 12 such that the blade retaining guide 32 is allowed to pivot slightly on the mounting pins 34 with respect to the socket body 12.

In various embodiments, the plurality of retaining blades 24 are disposed within one or more open pathways 36, which are defined by an interior surface of the blade guide 32 and exterior surface of the socket body 12. In particular, the one or more open pathways 36 are sized and shaped to permit longitudinal sliding movement of the retaining blades therethrough. In various arrangements, each mounting pin 36 is positioned within gaps between pairs of retaining blades 24, causing the mounting pins 34 to glide between the retaining blades 24 throughout reciprocal movement of the blade retaining ring 22 and retaining blades 24.

In various embodiments, the socket assembly 10 is provided with a compression spring 38 having a long axis that is coaxially disposed within the open interior portion 14 of the socket body 12. A first end portion 40 of the compression spring 38 is coupled with an interior wall 42 of the socket body 12. An opposite second end portion 44 of the compression spring 38 is positioned adjacent the open first end portion 14 of the socket body 12. In some embodiments, the second end portion 44 of the compression spring 38 extends freely and outwardly from the interior wall 42 and requires no additional stabilization or support. In some embodiments, the compression spring 38 is provided as an elongated coil spring. However, it is contemplated that various other resiliently deformable spring members could be provided in various shapes and configurations. However, in the embodiments that use an elongated coil spring, the second end portion 44 includes a plug 46 that closes the second end portion 44 of the compression spring 38. In some embodiments, the plug 46 is placed in a friction-fit engagement with the second end portion 44. In various embodiments, a washer 48 or other planar structure, may be secured with the plug 46 at the distal end of the second end portion 44. In particular embodiments, a screw 50 or other fastener may be used to secure the washer 48 with the plug 46. In this arrangement, the compression spring 38, with its plugged second end portion 44, serves as an engagement member to receive various fasteners and fastener components and bias them toward the open first end portion 14. It should be apparent that the force with which such objects are biased will be a function of the strength and resiliency of the compression spring 38 as well as the proximity with which the second end portion 44 approaches the open first end portion 14 of the socket body 12. Regardless, various fasteners and fastener components may be placed within the open interior portion 16 of the socket body 12 without becoming lost or misaligned within the socket body 12. In some embodiments; where portions of the mounting pins 34 extend into the open interior portion 16 of the socket body 12, the distal end portions of the mounting pins 34 may serve as positive stops to any fasteners or fastener components disposed within the open interior portion 16 of the socket body 12. In this manner, the fasteners will not be allowed to over travel within the open interior 16. In some embodiments, the first end portion 40 of the compression spring 38 may be secured to the interior wall 42 of the socket body 12 through various known mechanical means, such as adhesives, welding, and the use of various fasteners. However, in some embodiments, an opening is formed through the interior wall 42 such that a fastener 52, which may include a screw, bolt, and washer, may be passed through the opening in the interior wall 42 and extend into a plug 54 that is secured within the first end portion 40 of the compression spring 38. In this manner, the compression spring 38 is firmly anchored within the interior portion 16 of the socket body 12.

With reference to FIGS. 2A-2C and FIGS. 3A-3C, the fastener attachment system of the present technology may at times also be provided with a fastener jig 56 that may be used for supporting one or more fasteners in a particular position with respect to a structure so that the fasteners may be secured with that structure. Various embodiments of the fastener jig 56 will include a jig frame 58. At least one pair of opposing fastener jaws 60 and 62 are coupled with the jig frame 58. The opposing fastener jaws 60 and 62 are each provided with engagement faces 64 and 66, respectively. In some embodiments, at least one of the opposing fastener jaws 60 and 62 are slidably movable with respect to one another and the jig frame 58 between a releasing position, which positions the opposing fastener jaws 60 and 62 in a spaced apart relationship with one another and a securing position, which places the opposing fastener jaws 60 and 62 in close proximity with one another. In various embodiments, the engagement faces 64 and 66 are shaped to each define an open channel that is slightly recessed from a remaining portion of the opposing fastener jaws 60 and 62. It is contemplated that the engagement faces 64 and 66 may be shaped to accommodate the head portions of one or more various types of fasteners 68. In this regard, the opposing engagement faces 64 and 66, when placed closely adjacent one another, may define a single elongated channel. In some embodiments, however, the opposing engagement faces 64 and 66 may define individually shaped channels that closely approximate the size and shape of particular fastener heads. For example, each of the opposing engagement faces 64 and 66 may provide a plurality of individual recesses that are shaped to have a plurality of flat, angularly disposed faces that, when positioned closely adjacent one another, define a hexagonal bolt head recess. In this manner, it is contemplated that the opposing engagement faces 64 and 66 may be provided with nearly any shape to accommodate the head portion of a wide variety of different fasteners 68. While the aforedescribed engagement faces 64 and 66 have been described as recesses formed within the opposing fastener jaws 60 and 62, it is contemplated that protrusions may extend outwardly from one or more faces within the engagement faces 64 and 66 to accommodate individual recessed features of the head portions to various fasteners; for example, straight. Phillips, and star shaped recesses for threaded fasteners.

Figure 1A:
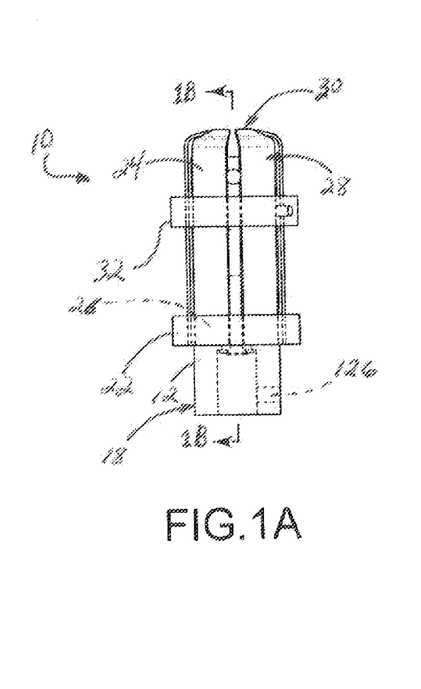
FIG. 1A depicts a side elevation view of one embodiment of a socket assembly of the present technology, as the same can be placed in a securing position.
Figures 1B, 1D, 1E:
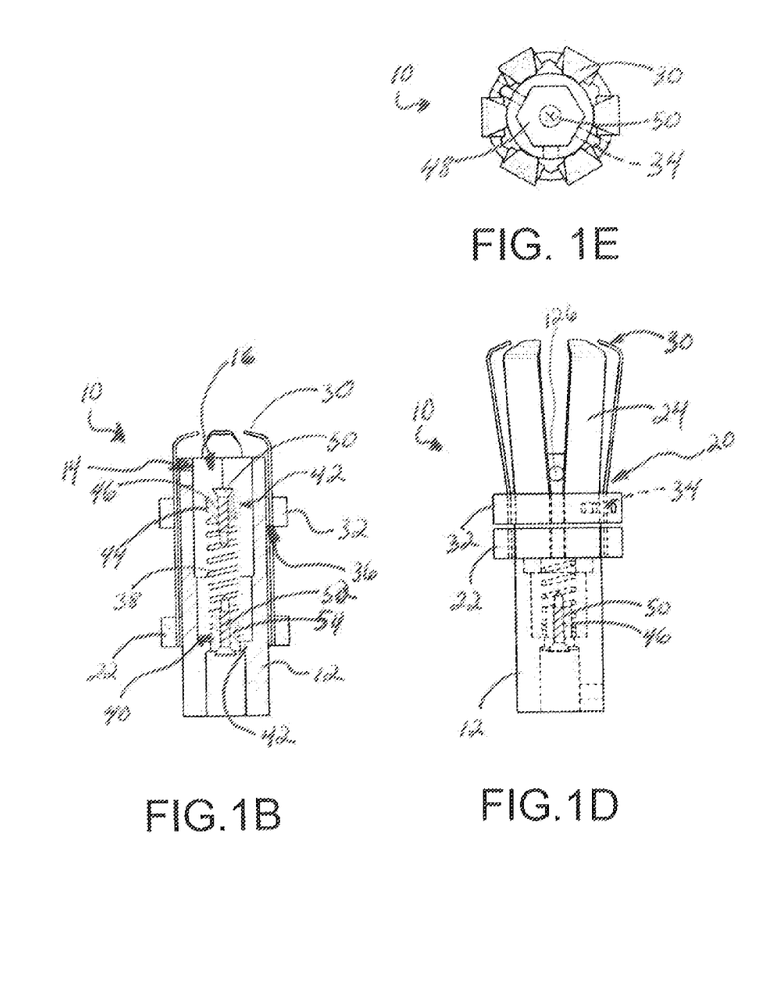
FIG. 1B depicts a cut-away, side elevation view of the socket assembly depicted in FIG. 1A.
FIG. 1D depicts a side elevation view of the socket assembly depicted in FIG. 1A, as the same can be placed in a releasing position.
FIG. 1E depicts a top plan view of the socket assembly depicted in FIG. 1D.
Figure 1C:
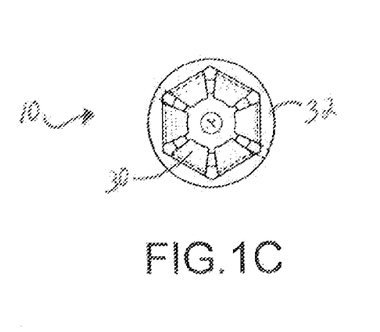
FIG. 1C depicts a top plan view of the socket assembly depicted in FIG. 1A.
Figure 2A:
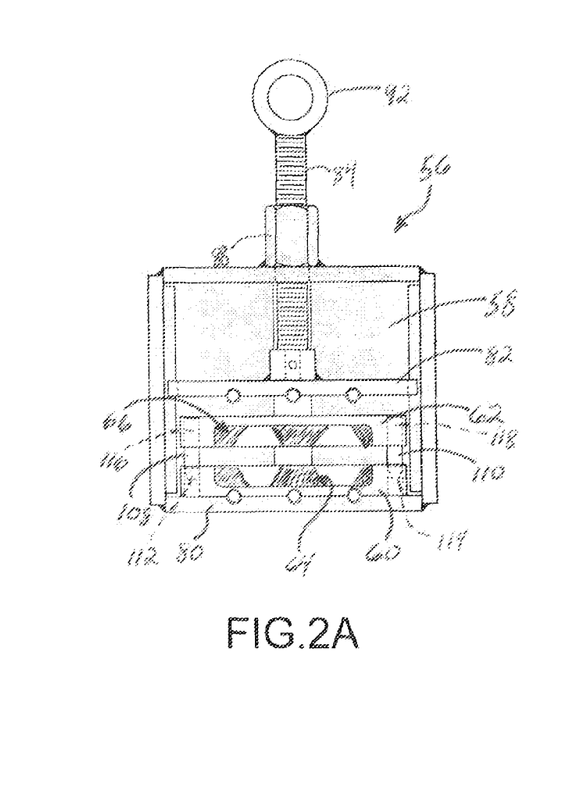
FIG. 2A depicts a top plan view of one embodiment of a fastener jig of the present technology, with a single set of fastener jaws, as the same can be placed with its fastener jaws in a releasing position.
Figure 2B:
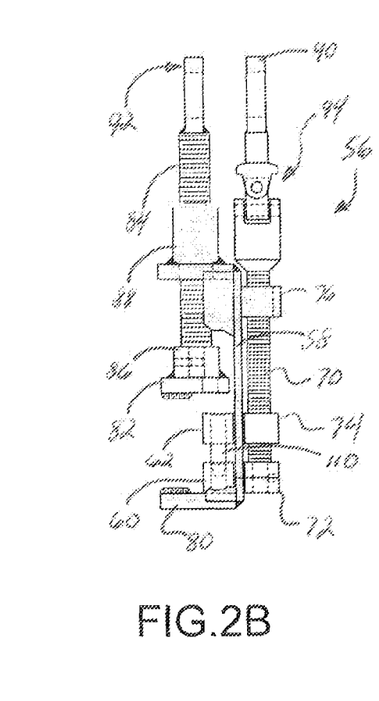
FIG. 2B depicts a cut-away, side elevation view of the fastener jig depicted in FIG. 2A.

With reference to FIG. 2B, the jig frame 58 may be provided with a fastener jaw bolt 70 that is coupled with at least one of the opposing fastener jaws 60 and 62. In some embodiments, the fastener jaw bolt 70 may have a distal end portion that is shaped to rotatably engage the first fastener jaw 60 in a manner that allows the fastener jaw bolt 70 to rotate with respect to the first fastener jaw 60 while preventing the first fastener jaw 60 from advancing or retreating along a length of the fastener jaw bolt 70. In particular embodiments, the distal end portion of the fastener jaw bolt 70 may be disposed within an opening formed in the first fastener jaw 60. A pin may be passed through the first fastener jaw 60 so that it passes within the opening formed within a first lug 72 that extends outwardly from the first fastener jaw 60 and terminates within a channel formed circumferentially within the distal end portion of the fastener jaw bolt 70. In this manner, the fastener jaw bolt 70 may not be withdrawn from the first fastener jaw 60 but may freely rotate therewith. In various embodiments, the first lug 72 will extend outwardly from a rearward face of the first fastener jaw 60, generally opposite the engagement face 64.

In various embodiments, the second fastener jaw 62 is provided with a second lug 74 that extends outwardly from a rearward face of the second fastener jaw 62, generally opposite its engagement face 66. In some embodiments, an opening may be formed through the second lug 74 that is shaped to allow the fastener jaw bolt 70 to penetrate the second lug 74. In various embodiments, the fastener jaw bolt 70 may be provided with threads that rotatably engage mating threads disposed within the opening in the second lug 74. In this manner, rotation of the fastener jaw bolt 70 in a first direction will move the opposing fastener jaws 60 and 62 toward the securing position. Rotation of the fastener jaw bolts 70 in an opposite second direction will move the opposite pair of fastener jaws 60 and 62 toward the releasing position with respect to one another. In certain embodiments, an alignment lug 74 may be provided to extend outwardly from a rearward portion of the jig frame 58. The alignment lug 74 may have an opening formed through the alignment lug 74 that is sized and shaped to allow the fastener jaw bolt 70 to penetrate the alignment lug 74. In some embodiments, the opening that penetrates the alignment lug 74 will not mechanically engage any structures extending from the fastener jaw bolt 70 (such as mating threads or the like) in a manner that would urge the alignment lug 74 along the length of the fastener jaw bolt 70 in either direction. Accordingly, in some instances, the opening that passes through the alignment lug 74 may simply be provided as a smooth bore. In this manner, the fastener jaw bolt 70 may be securely anchored to and aligned with the jig frame 58.

In order to maintain alignment of the fastener jaw bolt 70 with respect to the opposing fastener jaws 60 and 62 and the jig frame 58, the first lug 72, second lug 74, and the alignment lug 76 may all be provided to extend rearwardly from the jig frame 58. The first lug 72 and second lug 74 may be disposed through an open lug channel 78 that is formed in the jig frame 58. The alignment lug 76 may be securely coupled with the jig frame 58, adjacent the lug channel 78. In this manner, the first lug 72, second lug 74 and the alignment lug 76 are linearly aligned with one another to position the fastener jaw bolt 70 in a manner that permits smooth linear movement of the opposing fastener jaws 60 and 62 when the fastener jaw bolt 70 is rotated.

Figure 2C:
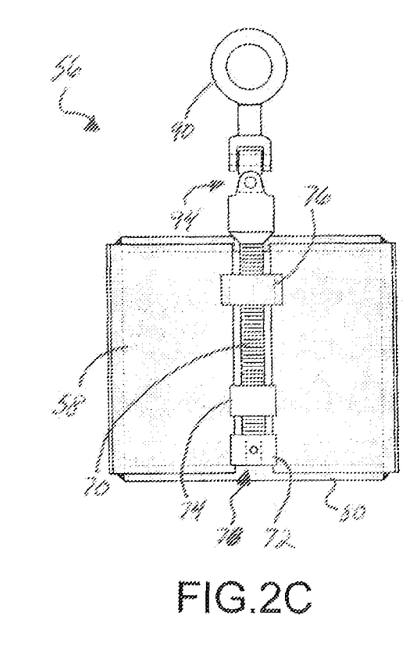
FIG. 2C depicts a bottom plan view of the fastener jig depicted in FIG. 2A.

In various embodiments, the fastener jig 56 is further provided with a pair of opposing mounting jaws 80 and 82 that are coupled with the jig frame 58. In various embodiments, at least one of the opposing mounting jaws 80 and 82 are slidably movable between a releasing position, which places the mounting jaw 80 and 82 in a spaced apart relationship with one another, and a securing position, which positions the mounting jaws 80 and 82 in closer proximity with one another. In at least some embodiments, the first mounting jaw 80 is secured to a distal end portion of the jig frame 58 and may, in certain embodiments, be formed as an end wall of the jig frame 58 that is fixed in position with respect to the jig frame 58. In such embodiments, the second mounting jaw 82 will be provided to be slidably movable with respect to the jig frame 58. To that end, the fastener jig 56 may be provided with a mounting jaw bolt 84 that is rotatably coupled with the jig frame 58 and the second mounting jaw 82 such that rotation of the mounting jaw bolt in a first direction advances the second mounting jaw 82 toward the securing position while rotating the mounting jaw bolt 84 in a second opposite direction, moves the second mounting jaw 82 toward the releasing position with respect to the first mounting jaw 80. In order to facilitate the movement of the second mounting jaw 82 with respect to the first mounting jaw 80 through rotation of the mounting jaw bolt 84, a distal end portion of the mounting jaw bolt 84 may be rotatably coupled with the second mounting jaw 82. In particular, an opening may be formed within the second mounting jaw 82 through which the distal end portion of the mounting jaw bolt 84 is received. A pin may be passed through the second mounting jaw 82 so that it passes into the opening and is received within a channel that is circumferentially formed in the distal end portion of the mounting jaw bolt 84. In this manner, the mounting jaw bolt 84 may not be withdrawn from within the opening formed in the second mounting jaw 82. However, it may freely rotate therewithout advancing or retreating the second mounting jaw 82 along a length of the mounting jaw bolt 84. In some embodiments, the opening formed through the second mounting jaw 82 is formed through a first lug 86 that extends from a rearward portion of the second mounting jaw 82. A second lug 88 may be provided to extend outwardly from the jig frame 58 in a position that aligns the mounting jaw bolt 84 with the first lug 86 of the second mounting jaw 82. Where the mounting jaw bolt 84 is provided as a threaded bolt, mating threads may be formed within the opening that passes through the second lug 88 to provide longitudinal movement of the mounting jaw bolt 84 when it is rotated in either direction. In this fashion, rotation of the mounting jaw bolt 84 will advance and retreat the mounting jaw bolt 84 and the second mounting jaw 82 with respect to the jig frame 58 and the first mounting jaw 80. In various embodiments, the opposing fastener jaws 60 and 62 will be disposed between the opposing mounting jaws 80 and 82. In this orientation, the mounting jaws may be placed in a secure position with respect to edge portions of a structure through which fasteners are to be secured. With the mounting jaws secured with opposite side portions of the structure, the fastener jaws 60 and 62 will be positioned to direct fasteners through openings that penetrate the structure to which they are to be secured.

It is contemplated that the proximal end portions 90 and 92 of the fastener jaw bolt 70 and mounting jaw bolt 84, respectively, may be shaped to engage a working end of a tool or other handle member. For example, the proximal end portions 90 and 92 could be shaped to have sockets that are received by working ends of socket wrenches. However, in various embodiments, the proximal end portions 90 and 92 are provided as closed, or substantially closed, eyes. In this manner, one or more hooks or other hooked-pin structures extending from tools such as hot-sticks may be used to engage the proximal end portions 90 or 92 and rotate the same. As it is contemplated that the proximal end portions 90 and 92 may be engaged with tools simultaneously, one or both of the fastener jaw bolts 70 and the mounting jaw bolts 84 may be provided with an articulating joint 94 that permits the associated proximal end of the bolt to extend away from the adjacent bolt for ease of engagement and manipulation of the same.

Figure 3A:
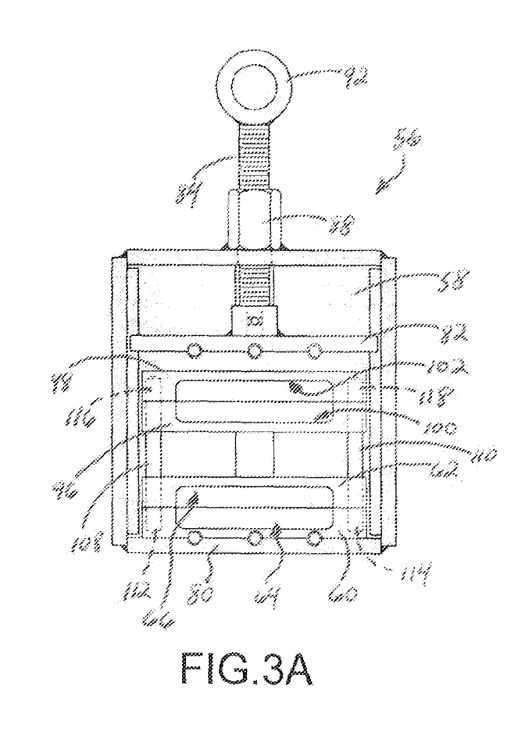
FIG. 3A depicts a top plan view of one embodiment of a fastener jig of the present technology, with two sets of fastener jaws, as the same can be placed with its fastener jaws in releasing positions.
Figure 3B:
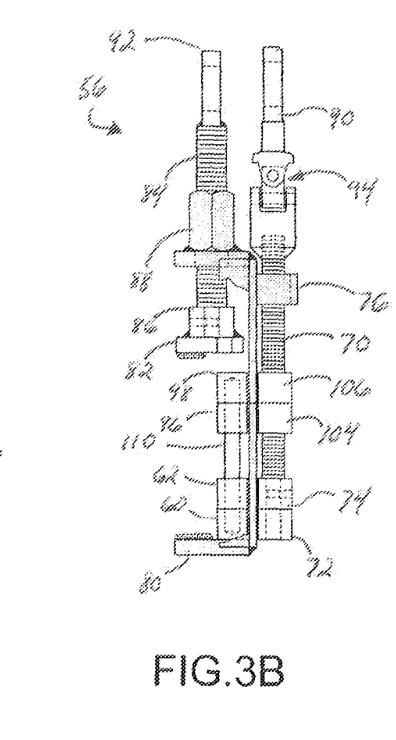
FIG. 3B depicts a cut-away, side elevation view of the fastener jig depicted in FIG. 3A.
Figure 3C:
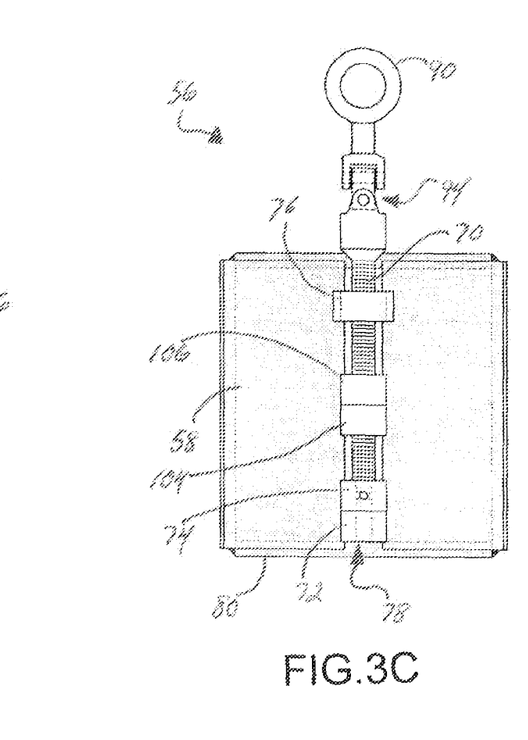
FIG. 3C depicts a bottom plan view of the fastener jig depicted in FIG. 3A.

With reference to FIGS. 3A-3C, some embodiments of the fastener attachment system will be provided with multiple pairs of opposing fastener jaws. In some embodiments, a second pair of opposing fastener jaws are coupled with the jig frame 58, between the first mounting jaw 80 and the second fastener jaw 62. Specifically, a third fastener jaw 96 is positioned adjacent the second fastener jaw 62. A fourth fastener jaw 98 is positioned adjacent the third fastener jaw 96. The third fastener jaw 96 and fourth fastener jaw 98, in various embodiments, will be provided with a similar design and function to those of the first fastener jaw 60 and second fastener jaw 62. In particular, the third fastener jaw 96 and fourth fastener jaw 98 are provided with an engagement face 100 and engagement face 102, respectively. The opposing engagement faces 100 and 102 may be shaped and oriented, with respect to the third fastener jaw 96 and fourth fastener jaw 98, in a manner similar to that described previously with respect to the engagement faces 64 and 66. A third lug 104 may be provided to extend rearwardly from the third fastener jaw 96 and a fourth lug 106 may be provided to extend rearwardly from the fourth fastener jaw 98. The third lug 104 and fourth lug 106 may further be positioned to extend through the lug channel 78 formed within the jig frame 58. In various embodiments, the fourth lug 106 is provided with mating threads that engage threads along an exterior surface of the fastener jaw bolt 70 such that rotation of the fastener jaw bolt 70 in opposite directions will advance and retreat the fourth fastener jaw 98 along a length of the fastener jaw bolt 70. An opening penetrating the third lug 104 may be provided with a smooth diameter that exceeds the outer diameter of the fastener jaw bolt 70 so that the third fastener jaw 96 does not advance or retreat along a length of the fastener jaw bolt 70 when the same is rotated in either direction.

In various embodiments, the first fastener jaw 60, second fastener jaw 62, third fastener jaw 96 and fourth fastener jaw 98 may each be coupled with a first guide rail 108 and opposing second guide rail 110. In some embodiments, first end portions 112 and 114 of the first guide rail 108 and second guide rail 110 may be securely anchored within side portions of the first fastener jaw 60. Similarly, a second end portion 116 and second end portion 118 of the first guide rail 108 and second guide rail 110, respectively, may be firmly secured within opposite side portions of the fourth fastener jaw 98. In these orientations, the first fastener jaw 60 and fourth fastener jaw 98 may be anchored in position with respect to one another and the fastener jig 56. Openings that penetrate the side portions of the second fastener jaw 62 and third fastener jaw 96 may be provided with a diameter greater than an outer diameter of the first guide rail 108 and second guide rail 110 such that the second fastener jaw 62 and third fastener jaw 96 may continue to advance and retreat along the length of the fastener jaw bolt 70 as it is rotated in each of its opposite directions. This arrangement provides uniform, simultaneous movement of the two fastener jaw assemblies with respect to one another. Alternate embodiments of the fastener jig 56 may simply provide sets of tabs that extend outwardly from the side portions of each of the fastener jaws 82 and are placed within side channels formed through the side portions of the jig frame 58. In such arrangements, one or more of the tabs could be anchored in a particular location with respect to the jig frame 58 to prevent movement of the same as its counterpart fastener jaw is advanced or retreated along the length of the fastener jaw bolt 70.

Figure 4A:
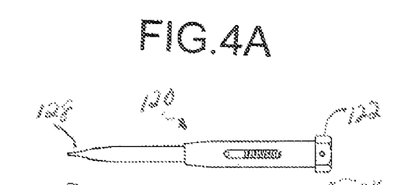
FIG. 4A depicts a top plan view of one embodiment of a cotter pin extracting tool as the same could be used with the socket assembly of the present technology.
Figure 4B:
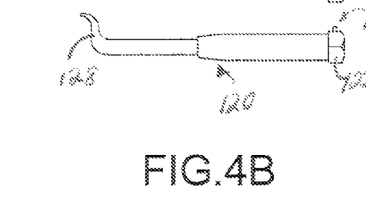
FIG. 4B depicts a side view of the cotter pin extracting tool depicted in FIG. 4A.
Figure 4C:
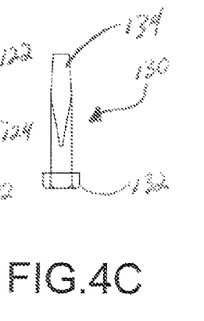
FIG. 4C depicts a side elevation view of one embodiment of a flat bladed screwdriver as the same could be used with the socket assembly of the present technology.
Figure 4D:
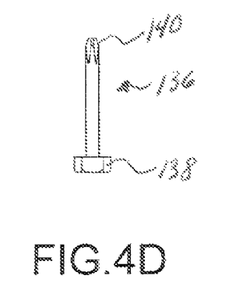
FIG. 4D depicts a side elevation view of one embodiment of a Phillips head screwdriver as the same could be used with the socket assembly of the present technology.

It is contemplated that various uses of the fastener attachment system may require additional tools to apply, remove, or otherwise engage fasteners associated with one or more structures. Accordingly, it is contemplated that a plurality of accessories may be designed to be at least partially received within the open interior portion 16 of the socket assembly 10 when the socket assembly 10 is coupled with a tool, such as a hot-stick, socket wrench, or the like. With reference to FIGS. 4A and 4B, a cotter pin extractor 120 may be provided with a first end portion 122 that is specifically shaped for secure engagement within the open interior portion 16 of the socket body 12. A locking button 124 may be provided to extend outwardly from the cotter pin extractor 120 and be received within a receiving aperture 126 formed through the socket body 12. An elongated pin may be used to pass through the receiving aperture 126, through the socket body 12, and depress the locking button 124 when removal of the cotter pin extractor 120 from the socket body 12 is desired. A second end portion 128 of the cotter pin extractor 120 may be provided with a hook shape familiar to those in the art as being used for the removal of cotter pins. Similar accessories can be provided, such as the screwdriver attachments depicted in FIGS. 4C and 4D. With reference to FIG. 4C, a blade-style screwdriver 130 may be provided with a first end portion 132 that is shaped to be received within the socket body 12. An opposite, second end portion 134 may be provided with a shape commonly indicative of bladed screwdrivers. With reference to FIG. 4D, a Phillips screwdriver attachment 136 may be provided with a first end portion 138 that is also shaped to be received within the socket body 12 but is provided with a second end portion 140 that includes a Phillips style head known in the art. It should be clear that the versatility of the design of the fastener attachment system of the present technology will permit the use of a vast array of accessories that may be associated with the socket assembly 10. In particular, the accessory attachments may be provided with nearly any fastener engagement shapes, common to tools used by most workmen.

Figure 5:
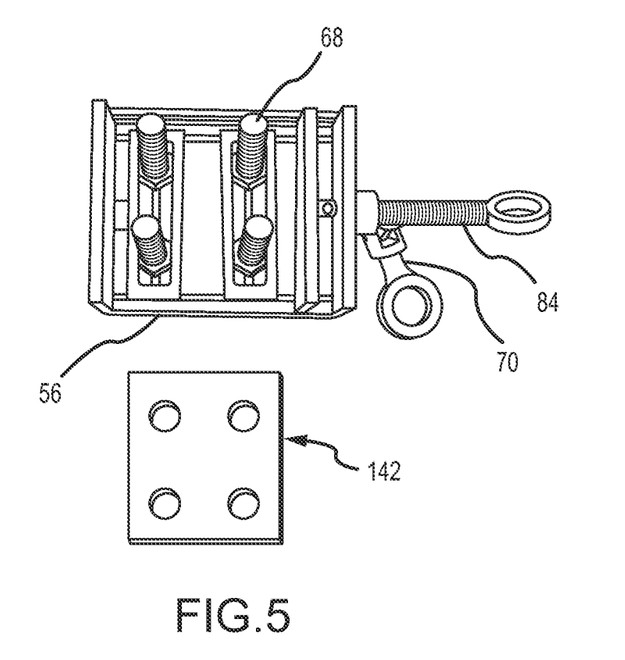
FIG. 5 depicts a top plan view of one embodiment of the fastener jig of the present technology, as the same could be loaded with four fasteners with the fastener jaws in securing positions, and a fastener alignment jig that may be used to load the fastener jig.
Figure 6:
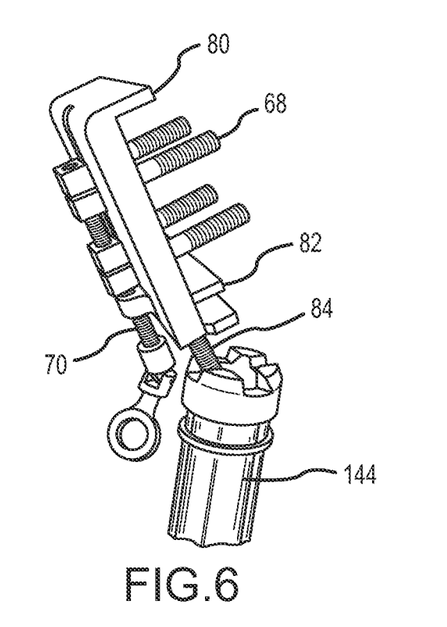
FIG. 6 depicts a side elevation view of the fastener jig of FIG. 5, as the same could be coupled with the end of a hot-stick tool.
Figure 7:
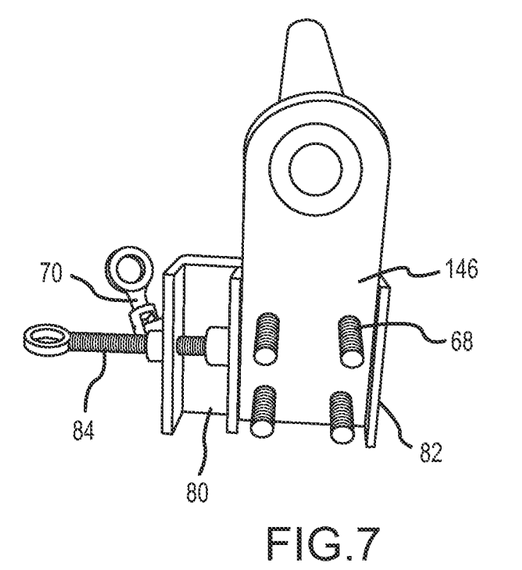
FIG. 7 depicts a front view of the fastener jig of FIG. 6 as one manner in which its mounting jaws may be placed in a securing position with respect to the edges of a dead-end body pad, as the fasteners within the fastener jaws extend through the openings in the dead-end body pad.

Several methods of use for the fastener attachment system are contemplated for engaging and securing or removing fasteners of a wide variety from an array of structures. For exemplary purposes only, an embodiment of the fastener attachment system will be described as the same could be used by workman users who seek to secure a jumper connector pad with a switch terminal connector pad with a plurality of fasteners. With reference to FIG. 5, a plurality of fasteners 68 are positioned between the first fastener jaw 60 and second fastener jaw 62. Similarly, a pair of fasteners 68 are disposed between the third fastener jaw 96 and the fourth fastener jaw 98. In particular applications, a fastener alignment jig 142 may be provided to ensure that the spacing between the fasteners 68 and their orientation is appropriate for the structure to which the fastener 68 will be secured. In various embodiments, the fastener alignment jig 142 is simply a plate member having a plurality of apertures that penetrate the plate member at the appropriate orientation with respect to one another. Once the plurality of fasteners 68 have been aligned within the first and second pairs of fastener jaws, the fastener jaw bolt 70 may be rotated to ensure that the fasteners 68 are secure in their position. The user may then couple the mounting jaw bolt 84 with a working end of a tool, such as the hooked end portion of a hot-stick 144. The user may then extend the hot-stick 144 and the fastener jig 56 toward a first structure, such as a conductor dead-end connector pad 146, which is designed to receive the fasteners 68. The fasteners 68 are guided through openings that penetrate the conductor dead-end connector pad 146. Once a portion of the side edges of the switch terminal connector pad are positioned between the first mounting jaw 80 and second mounting jaw 82, the mounting jaw bolt 84 is rotated using the hot-stick until the first mounting jaw 80 and second mounting jaw 82 are in a secure position with respect to the edges of the conductor dead-end connector pad 146. FIG. 7 depicts an exemplary manner in which the structures will appear after performing these steps.

Figure 8:
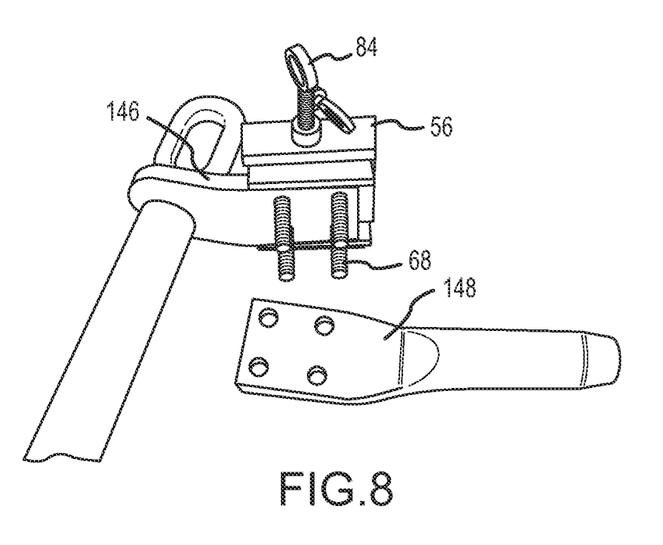
FIG. 8 depicts another manner in which the fastener jig and dead-end body pad of FIG. 7 may be coupled with one another, as a jumper pad is placed near the fastener ends prior to coupling the jumper pad with the fastener jig and the dead-end body pad.
Figure 9:
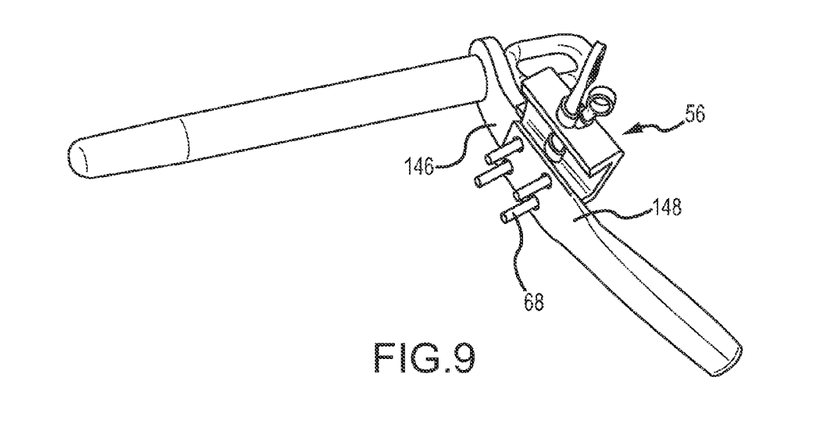
FIG. 9 depicts the jumper pad, fastener jig and dead-end body pad, depicted in FIG. 8, after the openings in the jumper pad have been placed over the ends of the fasteners extending from the fastener jig and the dead-end body pad.
Figure 10:
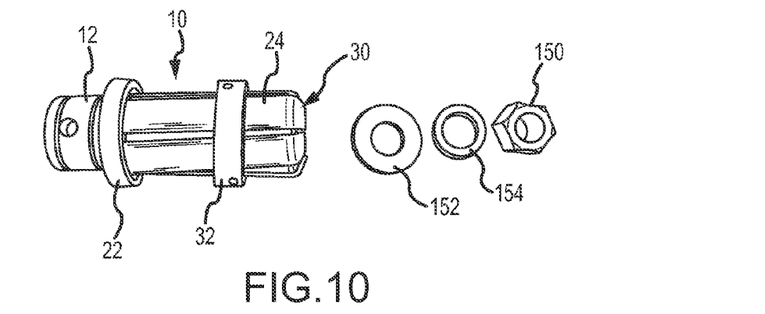
FIG. 10 depicts a side view of one embodiment of the socket assembly of the present technology and a plurality of fastener components, including a flat washer, a lock washer, and a threaded nut, which may all be coupled with the socket assembly within the retaining blades.
Figure 11:
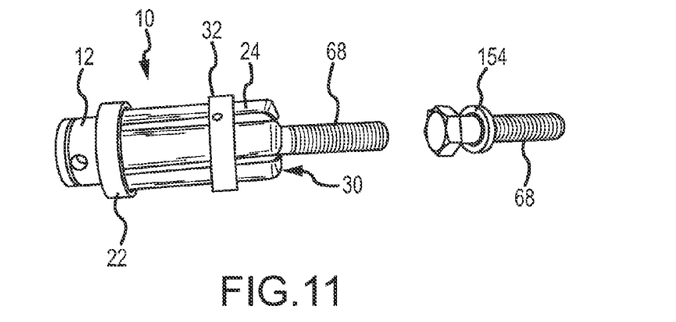
FIG. 11 depicts a side view of one embodiment of the socket assembly of the present technology as the same may be coupled with a threaded bolt and washer, such as depicted next to the socket assembly, within the retaining blades.
Figure 12:
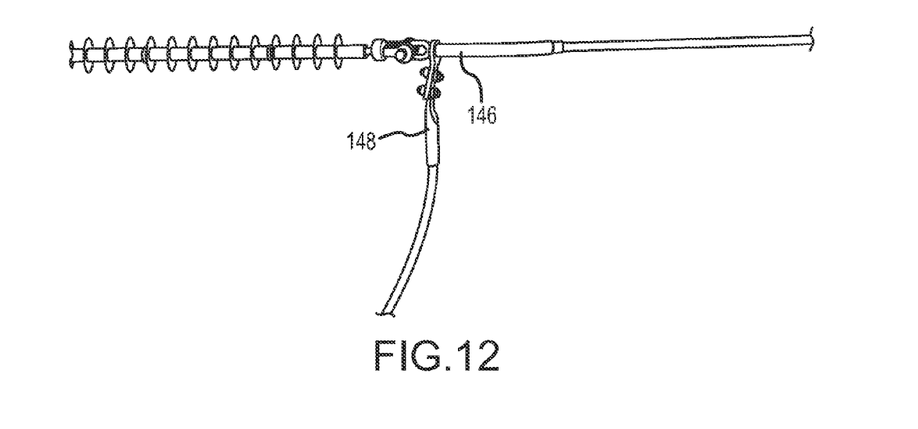
FIG. 12 depicts an exemplary assembly of a jumper pad that has been secured with a dead-end body pad using the fastener attachment system of the present technology.

With reference to FIG. 8, a workman user may use a tool to grab the distal end of a juniper connector pad 148 with another tool, such as a second lineman's hot-stick 144. The workman then manipulates the jumper connector pad 148 until the length of the fasteners 68 are passed through pairs of openings that penetrate the jumper connector pad 148. The first workman user may remove his hot-stick from the mounting jaw bolt 84 and secure the hot-stick 144 to the second end portion 18 of the socket assembly 10. Fastener components such as a nut 150, flat washer 152, and lock washer 154 may then be passed between the plurality of retaining blades 24 so that they are disposed within the open interior portion 16 of the socket body 12. The blade retaining ring 22 is then withdrawn away from the blade guide 32, which compresses the retaining blades 24 toward one another and secures the nut 150 and washers 154 and flat washer 152 within the socket body 12. In this position, the fastener components have partially compressed the compression spring 38, which biases the fastener components outwardly from the open first end portion 14 of the socket body 12. However, the tips 30 of the retaining blades 24 retain the fastener components within the socket body 12. The plurality of retaining blades 24 further align the fastener components with one another, preventing the need for the use of a separate alignment tool for the propensity for the fastener components to become misaligned during application. The workman user may then extend the hot-stick 144 toward a distal end portion of a fastener 68 and place the fastener components onto the distal end of the fastener 68. Rotation of the hot-stick 144 will thread the nut 150 onto the distal end of the fastener 68 and loosely secure the fastener components with the fastener 68. The workman user may then simply pull the hot-stick 144 and the socket assembly 10 free from the fastener component by pulling the socket assembly 10 from the fastener components will move the blade retaining ring 22 towards the blade retaining guide 32 allowing the retaining blades 24 to slide through the blade retaining guide 32 moving the retaining blade tips 30 outwardly from the open first end portion 14 of the socket body 12, the retaining blades 24 are resiliently deformable and will bias outwardly as the hot-stick 144 and socket assembly 10 are withdrawn from the fastener 68 and fastener components. This procedure is repeated until each of the fastener components 68 extending from the conductor dead-end connector pad 146 and jumper connector pad 148 have a series of fastener components loosely secured thereto. The workman user may then simply exchange the socket assembly 10 at the end of the hot-stick 144 with a standard socket which is then used to tightly secure each of the nuts 150 with the fasteners 68. In this manner, the switch terminal connector pad 146 and the jumper connector pad 148 are secure with one another. Disassembly of the fasteners to separate the structures from one another may be accomplished by simply reversing the assembly process. In this process, the socket assembly 10 may be used to grasp each of the fastener components so that they do not simply fall to the ground, such as has been the practice in the past.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A system for engaging fasteners, the system comprising:
a socket body having a longitudinal axis that extends between an open first end portion, which is in communication with an open interior portion of the socket body, and a second end portion; the open interior portion being at least partially defined by one or more sidewalls of the socket body;
a spring blade assembly, having a blade retaining ring and a plurality of resiliently deformable retaining blades; the blade retaining ring having an open interior through which the socket body is disposed such that the socket body and the blade retaining ring are coaxially aligned and the blade retaining ring may move toward and away from the open first end portion of the socket body, along a length of the socket body; the retaining blades having opposite first and second end portions, wherein the first end portions are secured with the blade retaining ring so that the second end portions of the retaining blades extend freely and outwardly from the blade retaining ring and the open first end portion of the socket body; the second end portions of the retaining blades having tips that are angled inwardly toward the long axis of the socket body;
a blade guide having an open interior through which the socket body is disposed such that the socket body and the blade retaining ring are coaxially aligned; the blade retaining guide being secured to the socket body such that longitudinal movement of the blade guide along the socket body length is substantially limited; one or more open pathways existing between the blade guide and the socket body; the plurality of retaining blades being disposed within the one or more open pathways, which are sized to permit sliding movement of the retaining blades; and
a plurality of mounting pins extending outwardly from the blade retaining guide and into the socket body such that the plurality of mounting pins extend at least partially into the open interior portion of the socket body.

2. The system of claim 1 further comprising:
a compression spring, having a longitudinal axis, coaxially disposed within the open interior portion of the socket body; a first end portion of the compression spring being coupled with an interior wall of the socket body and a second end portion of the compression spring positioned adjacent the open first end portion of the socket body.

3. The system of claim 2 wherein:
the compression spring is an elongated coil spring; the second end portion of the compression spring including a plug that closes the second end portion of the compression spring.

4. The system of claim 2 wherein:
the plurality of mounting pins being positioned with respect to the socket body and the compression spring such that the plurality of mounting pins substantially limit travel of objects past the plurality of mounting pins further into the open interior portion of the socket body, after partially compressing the compression spring.

5. The system of claim 4 wherein:
said plurality of mounting pins comprises two mounting pins secure the blade retaining guide with the socket body; each mounting pin being positioned within gaps between pairs of retaining blades; the pairs of retaining blades being positioned to move reciprocally with respect to the mounting pins.

6. The system of claim 5 wherein:
the two mounting pins are positioned directly on opposite sides of the socket from one another and allow the blade retaining guide to pivot slightly with respect to the socket body.

7. The system of claim 1 wherein:
each of the plurality of retaining blades include one or more bends, adjacent the blade retaining ring such that the retaining blades are slightly biased away from the socket body; the second end portions of the retaining blades angling away from the open first end portion of the socket body when the retaining ring is moved to a releasing position, adjacent the blade guide; the second end portions of the retaining blades extending generally parallel with the socket body and the tips of the retaining blades substantially covering the open first end portion of the socket body when the blade retaining ring is moved to a securing position, away from the blade guide.

8. The system of claim 1 further comprising:
a fastener jig, comprising:
a jig frame;
at least one pair of opposing fastener jaws operatively coupled with the jig frame; at least one of the at least one pair of fastener jaws being slidably movable between a releasing position and a securing position; the fastener jaws having engagement faces that secure at least one fastener between the fastener jaws in the securing position; and
a fastener jaw bolt operatively coupled with the at least one pair of opposing fastener jaws; the fastener jaw bolt being threadably coupled with at least one of the fastener jaws, such that rotation of the fastener jaw bolt in a first direction moves the at least one pair of fastener jaws toward the securing position and rotation of the fastener jaw bolt in a second direction moves the at least one pair of fastener jaws toward the releasing position.

9. The system of claim 8 wherein:
the fastener jig further comprises:
a pair of opposing mounting jaws that is coupled with the jig frame; at least one of the mounting jaws of the pair of mounting jaws being slidably movable between a releasing position and a securing position; the at least one pair of opposing fastener jaws being positioned between the pair of mounting jaws; and
a mounting jaw bolt operatively coupled with the pair of mounting jaws; the mounting jaw bolt being threadably coupled with the fastener jig, such that rotation of the mounting jaw bolt in a first direction moves a first mounting jaw of the pair of mounting jaws toward a second mounting jaw of the pair of mounting jaws, into the securing position, and rotation of the mounting jaw bolt in a second direction moves the first mounting jaw away from the second mounting jaw, into the releasing position.

10. The system of claim 8 wherein:
the at least one pair of opposing fastener jaws comprises:
a first pair of opposing fastener jaws and a second pair of opposing fastener jaws that are operatively coupled with the jig frame; at least one fastener jaw of each of the first and second pairs of fastener jaws each being slidably movable between a releasing position and a securing position; the first and second pairs of fastener jaws each being shaped to secure at least one fastener between the pairs of fastener jaws in their securing positions; and
the fastener jaw bolt operatively coupled with the first and second pairs of opposing fastener jaws; the fastener jaw bolt being threadably coupled with at least one of the fastener jaws from each of the first and second pairs of opposing fastener jaws, such that rotation of the fastener jaw bolt in a first direction moves the first and second pairs of fastener jaws toward the securing position and rotation of the fastener jaw bolt in a second direction moves the first and second pairs of fastener jaws toward the releasing position.

11. The system of claim 8 wherein:
the fastener jaw bolt includes an articulating joint at an end portion of the fastener jaw bolt.

12. The system of claim 11 wherein:
the fastener jaw bolt and the mounting jaw bolt include open eyes at end portions of the fastener jaw bolt and mounting jaw bolt; the fastener jaw bolt and the mounting jaw bolt being coupled with the fastener jig so that they are disposed in a generally parallel, spaced-apart relationship with one another.

13. A method of engaging at least one fastener component with at least one fastener and one or more structures, the method comprising:
providing a socket assembly, which comprises:
a socket body having a longitudinal axis that extends between an open first end portion, which is in communication with an open interior portion of the socket body, and a second end portion; the open interior portion being at least partially defined by one or more sidewalls of the socket body;
a spring blade assembly, having a blade retaining ring and a plurality of resiliently deformable retaining blades; the blade retaining ring having an open interior through which the socket body is disposed such that the socket body and the blade retaining ring are coaxially aligned and the blade retaining ring may move toward and away from the open first end portion of the socket body, along a length of the socket body; the retaining blades having opposite first and second end portions, wherein the first end portions are secured with the blade retaining ring so that the second end portions of the retaining blades extend outwardly from the blade retaining ring and the open first end portion of the socket body; the second end portions of the retaining blades having tips that are angled inwardly toward the long axis of the socket body;
a blade guide having an open interior through which the socket body is disposed, such that the socket body and the blade retaining ring are coaxially aligned; the blade retaining guide being secured to the socket body such that longitudinal movement of the entire blade guide along the socket body length is substantially limited; one or more open pathways existing between the blade guide and the socket body; the plurality of retaining blades being disposed within the one or more open pathways, which are sized to permit sliding, longitudinal movement of the retaining blades; and
a plurality of mounting pins extending outwardly from the blade retaining guide and into the socket body such that the plurality of mounting pins extend at least partially into the open interior portion of the socket body;
securing the at least one fastener component with the socket assembly at least partially between the retaining blades;
manipulating the socket assembly in a manner that couples the at least one fastener component with the at least one fastener; and
moving the socket assembly away from the at least one fastener component such that the at least one fastener component is extracted from between the retaining blades.

14. The method of claim 13, the method further comprising:
providing a fastener jig assembly, which comprises:
a jig frame;
at least one pair of opposing fastener jaws operatively coupled with the jig frame; at least one of the at least one pair of fastener jaws being slidably movable between a releasing position and a securing position; the fastener jaws having engagement faces that secure at least one fastener between the fastener jaws in the securing position; and
a fastener jaw bolt operatively coupled with the at least one pair of opposing fastener jaws; the fastener jaw bolt being threadably coupled with at least one of the fastener jaws, such that rotation of the fastener jaw bolt in a first direction moves the at least one pair of fastener jaws toward the securing position and rotation of the fastener jaw bolt in a second direction moves the at least one pair of fastener jaws toward the releasing position;

positioning a fastener head of the at least one fastener between the at least one pair of fastener jaws;

moving the at least one pair of fastener jaws into a securing position about the fastener head;

prior to the step of manipulating the socket assembly in a manner that couples the at least one fastener component with the at least one fastener, positioning the fastener jig closely adjacent a first structure having one or more structure openings that penetrate the first structure such that the one or more fasteners coupled with the fastener jig pass through the one or more structure openings.

15. The method of claim 14, the method further comprising:

prior to the step of manipulating the socket assembly in a manner that couples the at least one fastener component with the at least one fastener, positioning a second structure, having one or more structure openings that penetrate the second structure, closely adjacent the first structure so that the at least one fastener passes through the one or more structure openings in the second structure.

16. The method of claim 14, the method wherein:

the at least one pair of opposing fastener jaws comprising:

a pair of opposing mounting jaws that is coupled with the jig frame; at least one of the mounting jaws of the pair of mounting jaws being slidably movable between a releasing position and a securing position; the at least one pair of opposing fastener jaws being positioned between the pair of mounting jaws; and a mounting jaw bolt operatively coupled with the pair of mounting jaws; the mounting jaw bolt being threadably coupled with the fastener jig, such that rotation of the mounting jaw bolt in a first direction moves at least a first mounting jaw of the pair of mounting jaws toward a second mounting jaw of the pair of mounting jaws, into the securing position, and rotation of the mounting jaw bolt in a second direction moves the first mounting jaw away from the second mounting jaw, into the releasing position;

prior to the step of positioning a second structure closely adjacent the first, moving the pair of mounting jaws into a securing position wherein a portion of the first structure is secured between the opposing mounting jaws and movement of the fastener jig with respect to the first structure is substantially limited.

\* \* \* \* \*